United States Patent
Kakuwa et al.

(10) Patent No.: US 10,461,341 B2
(45) Date of Patent: Oct. 29, 2019

(54) FUEL CELL SYSTEM

(71) Applicant: Panasonic Corporation, Osaka (JP)

(72) Inventors: Takashi Kakuwa, Osaka (JP); Hideki Nakata, Kyoto (JP); Noboru Taniguchi, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 540 days.

(21) Appl. No.: 14/562,103

(22) Filed: Dec. 5, 2014

(65) Prior Publication Data
US 2016/0329580 A1 Nov. 10, 2016

(30) Foreign Application Priority Data

Dec. 19, 2013 (JP) ................................ 2013-262387

(51) Int. Cl.
H01M 8/04014 (2016.01)
H01M 8/0612 (2016.01)
(Continued)

(52) U.S. Cl.
CPC ... *H01M 8/04014* (2013.01); *H01M 8/04067* (2013.01); *H01M 8/04738* (2013.01);
(Continued)

(58) Field of Classification Search
CPC .......... H01M 8/0618; H01M 8/04014; H01M 8/04067; H01M 2008/1293; H01M 8/04753; H01M 8/0675; H01M 8/04738
(Continued)

(56) References Cited

U.S. PATENT DOCUMENTS

| 2003/0054215 A1* | 3/2003 | Doshi | H01M 8/004 429/423 |
| 2010/0203404 A1* | 8/2010 | Miyazaki | H01M 8/04014 429/423 |

(Continued)

FOREIGN PATENT DOCUMENTS

| JP | 6-240268 A | 8/1994 |
| JP | 9-007617 | 1/1997 |
| JP | 2002-124289 | 4/2002 |
| JP | 2002-124289 A | 4/2002 |

(Continued)

OTHER PUBLICATIONS

The Extended European Search Report dated May 19, 2015 for the related European Patent Application No. 14197072.3.

*Primary Examiner* — Jonathan G Jelsma
*Assistant Examiner* — Omar M Kekia
(74) *Attorney, Agent, or Firm* — McDermott Will & Emery LLP

(57) ABSTRACT

A fuel cell system includes a hydrodesulfurizer that removes a sulfur compound from raw material and that is heated with heat of exhaust gas flowing in the fuel cell system; a fuel cell that generates power through an electrochemical reaction using fuel and oxidant gas, the fuel being obtained by reforming raw material from which the sulfur compound has been removed by the hydrodesulfurizer; an introduction passage through which the exhaust gas that is to heat the hydrodesulfurizer passes; a first heat exchanger disposed in the introduction passage and that preheats, with heat of the exhaust gas passing through the introduction passage, the oxidant gas to be supplied to the fuel cell; and a second heat exchanger that preheat, with heat of exhaust gas passing through a passage other than the introduction passage, the oxidant gas to be preheated by the first heat exchanger.

10 Claims, 8 Drawing Sheets

(51) Int. Cl.
  *H01M 8/04007* (2016.01)
  *H01M 8/04701* (2016.01)
  *H01M 8/04746* (2016.01)
  *H01M 8/0662* (2016.01)
  *H01M 8/124* (2016.01)

(52) U.S. Cl.
  CPC ..... *H01M 8/04753* (2013.01); *H01M 8/0618* (2013.01); *H01M 8/0675* (2013.01); *H01M 2008/1293* (2013.01)

(58) Field of Classification Search
  USPC .................................. 429/410, 425, 435, 436
  See application file for complete search history.

(56) References Cited

U.S. PATENT DOCUMENTS

| | | | |
|---|---|---|---|
| 2011/0027675 A1* | 2/2011 | Bai | H01M 8/0297 429/425 |
| 2012/0208098 A1* | 8/2012 | Ohkawara | H01M 8/04089 429/410 |
| 2013/0273445 A1 | 10/2013 | Kobayashi | |

FOREIGN PATENT DOCUMENTS

| | | |
|---|---|---|
| JP | 2004-060975 A | 2/2004 |
| JP | 2006-054171 | 2/2006 |
| JP | 2011-216308 | 10/2011 |
| JP | 2013-212961 A | 10/2013 |
| JP | 2013-229203 A | 11/2013 |
| WO | 2013/035312 A1 | 3/2013 |
| WO | 2013/171980 | 11/2013 |

* cited by examiner

FUEL CELL SYSTEM

BACKGROUND

1. Technical Field

The present disclosure relates to a fuel cell system including a hydrodesulfurizer configured to remove a sulfur component from hydrocarbon-containing raw material.

2. Description of the Related Art in general, in a fuel cell system using hydrocarbon as raw material (raw fuel) such as a solid oxide fuel cell system, in order to reform the raw material, for example, steam reforming using steam is used. In order to promote this steam reforming, a steam reforming catalyst is used. The steam reforming catalyst may be degraded by an odorant or a sulfur compound contained in raw material gas. In order to suppress such degradation of a steam reforming catalyst, a desulfurizer is used that is configured to reduce the content of an odorant or a sulfur compound in raw material.

Such a desulfurizer is, for example, a desulfurizer configured to perform desulfurization at high temperature. For example, there is a hydrodesulfurizer configured to perform desulfurization by hydrodesulfurization method.

A solid oxide fuel cell system has been proposed in which combustion exhaust gas is used to heat a desulfurizer, the combustion exhaust gas having been cooled to about 300° C. by heat exchange with the air or the like supplied to the fuel cell (for example, Japanese Unexamined Patent Application Publication No. 2002-124289; hereafter referred to as PTL 1).

SUMMARY

However, the existing fuel cell system described in PTL 1 can still be improved in power generation efficiency and the temperature setting of the desulfurizer.

One non-limiting and exemplary embodiment provides a fuel cell system in which the power generation efficiency is higher than that of the existing fuel cell system and a hydrodesulfurizer can be heated at an optimal temperature with stability.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

A fuel cell system according to an aspect of the present disclosure includes a hydrodesulfurizer that removes a sulfur compound from raw material and that is heated with heat of exhaust gas flowing in the fuel cell system; a fuel cell that generates power through an electrochemical reaction using fuel and oxidant gas supplied to the fuel cell, the fuel being obtained by reforming the raw material from which the sulfur compound has been removed by the hydrodesulfurizer; an introduction passage through which the exhaust gas that is to heat the hydrodesulfurizer passes; a first heat exchanger disposed in the introduction passage and that preheats, with heat of the exhaust gas passing through the introduction passage, the oxidant gas to be supplied to the fuel cell; and a second heat exchanger that preheats, with heat of exhaust gas passing through a passage other than the introduction passage, the oxidant gas to be preheated by the first heat exchanger.

These general and specific aspects may be implemented using a system and a method, and any combination of systems and methods.

A fuel cell system according to an embodiment of the present disclosure is advantageous in that the power generation efficiency is higher than that of the existing fuel cell system and a hydrodesulfurizer can be heated at an optimal temperature with stability.

DETAILED DESCRIPTION

Figure 1:
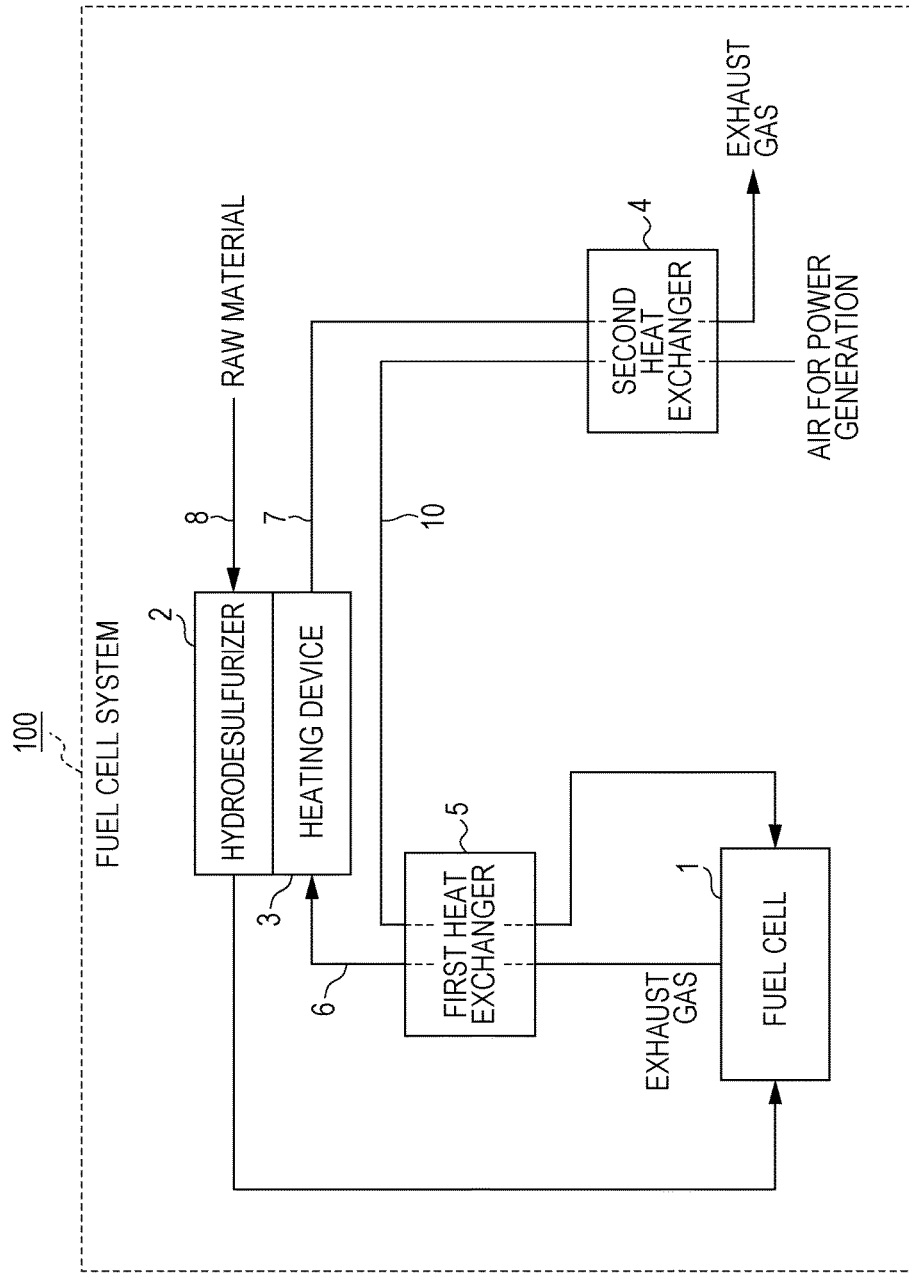
FIG. 1 is a block diagram illustrating an example of a main configuration of a fuel cell system according to a first embodiment.

The inventor of the present disclosure performed thorough studies and, as a result, has found the following findings.

As described above, in PTL 1, the desulfurizer is heated with exhaust gas having been heat-exchanged with oxidant gas supplied to the fuel cell. In this case, for example, when the amount of oxidant gas supplied is increased with an increase in the amount of power generation of the fuel cell, the exhaust gas having been heat-exchanged with the oxidant gas may have a low temperature that is out of the suitable temperature range for the desulfurizer.

Accordingly, prior to such heating of oxidant gas with exhaust gas that is to heat the desulfurizer, the oxidant gas can be preheated with exhaust gas that is not to heat the desulfurizer, so that the oxidant gas is preheated and hence an amount of heat of exhaust gas that is to heat the desulfurizer, the amount of heat being required for heating the oxidant gas, is reduced. As a result, even when the amount of oxidant gas supplied is increased, the temperature drop in exhaust gas that is to heat the desulfurizer, the temperature drop being caused by heating of the oxidant gas, is reduced. Thus, the desulfurizer tends not to be out of the suitable temperature range, compared with the existing fuel cell system.

A fuel cell system according to a first aspect of the present disclosure includes a hydrodesulfurizer that removes a sulfur compound from raw material and that is heated with heat of exhaust gas flowing in the fuel cell system; a fuel cell that generates power through an electrochemical reaction using fuel and oxidant gas supplied to the fuel cell, the fuel being obtained by reforming the raw material from which the sulfur compound has been removed by the hydrodesulfurizer; an introduction passage through which the exhaust gas that is to heat the hydrodesulfurizer passes; a first heat exchanger disposed in the introduction passage and that preheats, with heat of the exhaust gas passing through the introduction passage, the oxidant gas to be supplied to the fuel cell; and a second heat exchanger that preheats, with heat of exhaust gas passing through a passage other than the introduction passage, the oxidant gas to be preheated by the first heat exchanger.

Since the fuel cell system includes the second heat exchanger, the oxidant gas to be preheated by the first heat exchanger can be preheated with heat of exhaust gas passing through a passage other than the introduction passage. In this way, the oxidant gas having been preheated by the second heat exchanger is further preheated by the first heat exchanger. Accordingly, regarding the exhaust gas passing through the introduction passage, an amount of heat of the exhaust gas used in the first heat exchanger can be reduced.

As a result, for example, even when the amount of oxidant gas supplied is increased with an increase in the amount of power generation of the fuel cell, the temperature drop in exhaust gas caused by passing through the first heat exchanger is reduced, so that the desulfurizer tends not to be out of the suitable temperature range, compared with the existing fuel cell system.

By changing the heat exchanging capability ratio between the second heat exchanger and the first heat exchanger, an amount of heat of exhaust gas to be used in the first heat exchanger can be controlled. The heat exchanging capability can be controlled by changing conditions that define heat exchange efficiency, such as the areas of heat-exchange surfaces of the second heat exchanger and the first heat exchanger. Thus, in the fuel cell system according to the first aspect of the present disclosure, exhaust gas in a temperature range suitable for heating the hydrodesulfurizer can be passed through the introduction passage and used to heat the hydrodesulfurizer. Therefore, the hydrodesulfurizer can be set to an optimal temperature with stability.

The second heat exchanger that preheats the oxidant gas with heat of exhaust gas passing through a passage other than the introduction passage. Thus, a portion of the heat of the exhaust gas can be recovered in the fuel cell system and can be supplied to power generation of the fuel cell. Accordingly, the fuel cell system according to the first aspect of the present disclosure can have an enhanced power generation efficiency.

In summary, the fuel cell system according to the first aspect of the present disclosure is advantageous in that the power generation efficiency is higher than that of the existing fuel cell system and the hydrodesulfurizer can be heated at an optimal temperature with stability.

The above-described exhaust gas may be any exhaust gas flowing in the fuel cell system. Examples of the exhaust gas include combustion exhaust gas, and anode off-gas and cathode off-gas, which are discharged from the fuel cell.

The "exhaust gas passing through a passage other than the introduction passage" may be an exhaust gas of a type different from that of the exhaust gas passing through the introduction passage, or may be an exhaust gas of the same type as that of the exhaust gas passing through the introduction passage. In short, the "exhaust gas passing through a passage other than the introduction passage" may be any exhaust gas passing through a passage other than the introduction passage.

In a fuel cell system according to a second aspect of the present disclosure, the fuel cell system according to the first aspect above may further include a discharging passage that discharges, outside the fuel cell system, the exhaust gas having been heat-exchanged to heat the hydrodesulfurizer, wherein the second heat exchanger is that preheats the oxidant gas with, as heat of the exhaust gas passing through a passage other than the introduction passage, heat of the exhaust gas passing through the discharging passage.

In this configuration, the second heat exchanger can preheat the oxidant gas with heat of the exhaust gas having been heat-exchanged to heat the hydrodesulfurizer. In short, the exhaust gas having been heat-exchanged to heat the hydrodesulfurizer can be further subjected to heat recovery to preheat the oxidant gas. Accordingly, the fuel cell system according to the second aspect of the present disclosure can have an enhanced power generation efficiency.

In a fuel cell system according to a third aspect of the present disclosure, the fuel cell system according to the first aspect above may further include an anode off-gas passage that passes anode off-gas, which is the fuel not having been used to generate power by the fuel cell, wherein the introduction passage that guides, as the exhaust gas cathode off-gas, which is oxidant gas not having been used to generate power by the fuel cell, and the second heat exchanger that preheats the oxidant gas with, as heat of the exhaust gas passing through a passage other than the introduction passage, heat of the anode off-gas passing through the anode off-gas passage.

In this configuration, the second heat exchanger can preheat the oxidant gas to be preheated by the first heat exchanger, with heat of the exhaust gas passing through the anode off-gas passage. Accordingly, an amount of heat of the exhaust gas (cathode off-gas) used in the first heat exchanger can be reduced, the exhaust gas passing through the introduction passage.

By changing the heat exchanging capability ratio between the second heat exchanger and the first heat exchanger, an amount of heat of exhaust gas to be used in the first heat exchanger can be controlled. Thus, in the fuel cell system according to the third aspect of the present disclosure, exhaust gas in a suitable temperature range can be passed through the introduction passage to the heating device.

A fuel cell system according to a fourth aspect of the present disclosure includes a hydrodesulfurizer that removes a sulfur compound from raw material; a fuel cell that generates power through an electrochemical reaction using fuel and oxidant gas supplied to the fuel cell, the fuel being obtained by reforming raw material from which the sulfur compound has been removed by the hydrodesulfurizer; a first heat exchanger that preheats the oxidant gas with heat of the exhaust gas discharged from the fuel cell; and a second heat exchanger that preheats, with heat of the exhaust gas having been heat-exchanged in the first heat exchanger, the oxidant gas to be preheated by the first heat exchanger, wherein the hydrodesulfurizer is heated with heat of the oxidant gas having been preheated by the second heat exchanger.

In this configuration, the hydrodesulfurizer can be heated with heat of the oxidant gas having been preheated by the second heat exchanger. The oxidant gas having been preheated by the second heat exchanger is heat-exchanged to heat the hydrodesulfurizer, so that the oxidant gas is partially deprived of heat. However, compared with a configuration in which oxidant, as not preheated is guided to the first heat exchanger, an amount of heat of the exhaust gas used to preheat the oxidant has in the first heat exchanger can be reduced. Thus, exhaust gas having been heat-exchanged in the first heat exchanger still has a high temperature and this high-temperature exhaust gas can be guided to the second heat exchanger. Accordingly, the oxidant gas can be sufficiently preheated in the second heat exchanger such that the oxidant gas can be used as a heat source for the hydrodesulfurizer.

In addition, compared with a configuration in which exhaust gas having been heat-exchanged by the first heat exchanger is discharged outside the fuel cell system without subsequent heat recovery, in the fuel cell system according to the fourth aspect of the present disclosure, heat of the exhaust gas can be further recovered by the second heat exchanger and supplied to power generation of the fuel cell. Thus, the power generation efficiency of the fuel cell system can be enhanced.

In a fuel cell system according to a fifth aspect of the present disclosure, the fuel cell system according to the second aspect above may further include a heating device that heats the hydrodesulfurizer with heat of the exhaust gas flowing in the fuel cell system, wherein the first heat exchanger and the second heat exchanger are integrated through connection via a buffer including a portion of the introduction passage connecting the heating device to the first heat exchanger and a portion of the discharging passage connecting the heating device to the second heat exchanger.

In this fuel cell system including the buffer, the first heat exchanger and the second heat exchanger are connected to the heating device via the buffer, so that exhaust gas can be passed from the first heat exchanger to the heating device and from this heating device to the second heat exchanger. This buffer can also physically separate the first heat exchanger and the second heat exchanger from each other.

As described above, the first heat exchanger and the second heat exchanger may be integrated via the buffer. In this case, the fuel cell system can be designed so as to have a smaller size.

Regarding a fuel cell system according to a sixth aspect of the present disclosure, in the fuel cell system according to the first aspect above, the second heat exchanger may be a double-pipe heat exchanger that performs outer pipe-inner pipe heat exchange between the exhaust gas passing through a passage other than the introduction passage and the oxidant gas be preheated by the first heat exchanger.

In a fuel cell system according to a seventh aspect of the present disclosure, the fuel cell system according to the second aspect above may further include a raw material preheater that preheats toe raw material to be supplied to the fuel cell, with heat of the exhaust gas having been heat-exchanged in the second heat exchanger.

Since this fuel cell system includes the raw material preheater, the exhaust gas having been heat-exchanged by the second heat exchanger can be further subjected to heat recovery. Accordingly, this fuel cell system can have an enhanced power generation efficiency.

In a fuel cell system according to an eighth aspect of the present disclosure, the fuel cell system according to the second aspect above may further include a reformer that reforms raw material having been desulfurized by the hydrodesulfurizer, through a reforming reaction with steam; and an evaporator that generates steam with heat of the exhaust gas having been heat-exchanged in the second heat exchanger.

Since this fuel cell system includes the evaporator, the exhaust gas having been heat-exchanged by the second heat exchanger can be further subjected to heat recovery. Accordingly, this fuel cell system can have an enhanced power generation efficiency.

First Embodiment

Referring to FIG. 1, a fuel cell system 100 according to an embodiment will be described. In this embodiment, a fuel cell system including a solid oxide fuel cell (SOFC) as a fuel cell 1 will be described as an example. However, the fuel cell 1 is not limited to a solid oxide fuel cell. The fuel cell 1 can be selected from fuel, cells that can be installed in fuel cell systems configured to discharge high-temperature exhaust gas. For example, the fuel cell 1 may be a molten carbonate fuel cell (MCFC) or a polymer electrolyte fuel cell (PEFC). FIG. 1 is a block diagram illustrating an example of a main configuration of the fuel cell system 100 according to the first embodiment.

As illustrated in FIG. 1, the fuel cell system 100 includes the fuel cell 1 (solid oxide fuel cell), a hydrodesulfurizer 2, a heating device 3, a second heat exchanger 4, and a first heat exchanger 5. The fuel cell system 100 further includes an introduction passage 6 configured to guide, to the heating device 3, exhaust gas flowing in the fuel cell system 100, such as exhaust gas discharged from the fuel cell 1; a discharging passage 7 configured to discharge exhaust gas from the heating device 3 to outside the fuel cell system 100; a material supplying passage 8 configured to supply raw material to the fuel cell 1; and an air passage 10 configured to supply oxidant gas (the air for power generation).

The fuel cell 1 is configured to generate power through an electrochemical reaction using fuel and oxidant gas, the fuel being obtained by reforming raw material from which a sulfur compound has been removed by the hydrodesulfurizer 2, the oxidant gas being supplied through the air passage 10. The fuel cell system 100 is configured to supply raw material through the material supplying passage 8 to the hydrodesulfurizer 2. Examples of the raw material include city as and gases mainly containing hydrocarbon such as propane gas. In this specification, the term "fuel" denotes reformed gas obtained by a reforming reaction of raw material from which a sulfur component has been removed by the hydrodesulfurizer 2.

The fuel cell 1 may include a cell stack in which electric cells are connected in series. Each electric cell includes an anode to which fuel is supplied and a cathode to which oxidant gas is supplied, and is configured to generate power through an electrochemical reaction between the anode and the cathode. Alternatively, the fuel cell 1 may include cell stacks in which electric cells are connected in series, the cell stacks being further connected in parallel. Alternatively, the fuel cell 1 may include a cylindrical type cell including two electrode layers (anode and cathode) in which oxidant gas is supplied inside the cylindrical type cell and fuel is supplied outside the cylindrical type cell.

The electric cells of the fuel cell 1 may contain a solid electrolyte such as zirconia doped with yttria (yttria-stabilized zirconia: YSZ), zirconia doped with ytterbium or scandium, or lanthanum gallate-based solid electrolyte. For example, in the case where electric cells contain YSZ, power is generated in a temperature range of about 600° C. to about 900° C., though the temperature range depends on the thickness of the cells.

The fuel cell system 100 according to the first embodiment may include a combustor configured to generate combustion exhaust gas by combustion of fuel and oxidant gas that have not been used in the fuel cell 1; and this combustion exhaust gas may be passed as the above-described exhaust gas through the introduction passage 6 to the heating device 3. In the case where the fuel cell 1 is a flat plate type fuel cell, unused oxidant gas (cathode off-gas) discharged from the cathode may be passed as the above-described exhaust gas through the introduction passage 6 to the heating device 3. This cathode off-gas has a high temperature because the fuel cell 1 operates at a high temperature.

Accordingly, the cathode off-gas has such a large amount of heat that it can serve as a heat source in the heating device 3.

A reformer (not shown in FIG. 1) may be disposed between the hydrodesulfurizer 2 and the fuel cell 1 in the material supplying passage 8; and the reformer may be configured to reform raw material from which a sulfur compound has been removed by the hydrodesulfurizer 2. Alternatively, since a solid oxide fuel cell operates at a high temperature of about 600° C. to about 900° C., steam reforming (internal reforming) may be performed within the fuel cell 1 by catalysis of nickel, which serves as a main component of the anode.

The hydrodesulfurizer 2 is configured to remove a sulfur compound from raw material by using hydrogen. That is, the hydrodesulfurizer 2 is a desulfurizer configured to remove a sulfur component from raw material by the hydrodesulfurization method. The hydrodesulfurizer 2 is connected to the material supplying passage 8. Raw material is supplied from outside the fuel cell system 100 through the material supplying passage 8 into the hydrodesulfurizer 2. Raw material supplied into the hydrodesulfurizer 2 contains hydrogen (not shown in FIG. 1). This hydrogen contained in raw material may be supplied from outside the fuel cell system 100 or, for example, by supplying a portion of reformed gas generated by reforming in a reformer. Alternatively, in the case where the fuel cell 1 is a flat plate type fuel cell, the hydrogen may be supplied by supplying a portion of unused fuel (anode off-gas) discharged from the anode of fuel cell 1.

The hyrodesulfurizer 2 is filled with a desulfurizing catalyst. For example, this desulfurizing catalyst may contain copper and zinc. The desulfurizing catalyst is not limited to this desulfurizing catalyst and can be selected from desulfurizing catalysts that allow hydrodesulfurization. For example, the desulfurizing catalyst may be a combination of a NiMo-based or CoMo-based catalyst and zinc oxide. In the case of using a desulfurizing catalyst that is a combination of a NiMo-based or CoMo-based catalyst and zinc oxide, the hydrodesulfurizer 2 causes hydrogenolysis of organic sulfur in fuel gas in the temperature range of 350° C. to 400° C. In the hydrodesulfurizer 2, the resultant $H_2S$ is removed by adsorption onto ZnO in the temperature range of 350° C. to 400° C.

For example, in the case where raw material is city gas, it contains, as an odorant, a sulfur compound that is dimethyl sulfide ($C_2H_6S$, DMS). This DMS is removed with desulfurizing catalyst in the hydrodesulfurizer 2 in the form of ZnS provided by the following reaction formulae (formulae (1) and (2)) or by physical adsorption.

$$C_2H_6S+2H_2 \rightarrow 2CH_4+H_2S \tag{1}$$

$$H_2S+ZnO \rightarrow H_2O+ZnS \tag{2}$$

The odorant is not limited to DMS described above and may be another sulfur compound such as IBM ($C_4H_{10}S$) or THT ($C_4H_8S$).

In the case where the hydrodesulfurizer 2 is filled with a desulfurizing catalyst containing copper and zinc, desulfurization is performed in a temperature range of about 10° C. to about 400° C., or about 250° C. to about 300° C. This copper zinc based desulfurizing catalyst allows hydrodesulfurization and physical adsorption. This catalyst mainly causes physical adsorption at low temperature and causes chemical adsorption at high temperature ($H_2S+ZnO \rightarrow H_2O+ZnS$). As a result, the sulfur content of desulfurized fuel gas is 1 vol ppb (parts per billion) or less, normally 0.1 vol ppb or less.

In the case where the hydrodesulfurizer 2 is filled with a desulfurizing catalyst that is a NiMo-based or CoMo-based catalyst or a desulfurizing catalyst containing copper and zinc, the amount of a sulfur component removed per unit volume becomes large. Accordingly, in the case of using such a desulfurizing catalyst, the amount of the desulfurizing catalyst used for removing sulfur to achieve a desired sulfur concentration can be decreased.

When the desulfurizing catalyst of the hydrodesulfurizer 2 is degraded as a result of long-term operation of the fuel cell system 100, the performance of the fuel cell system 100 is degraded. Accordingly, the hydrodesulfurizer 2 may be removably attached to the fuel cell system 100 such that the hydrodesulfurizer 2 containing a degraded desulfurizing catalyst can be replaced by a new hydrodesulfurizer 2.

Raw material having thus been desulfurized by the hydrodesulfurizer 2 is supplied, in the case of being reformed by internal reforming, to the fuel cell 1; alternatively, in the case of being reformed by a reformer, the raw material is supplied to the reformer. The reformer may be configured to perform partial oxidation reforming. However, in order to achieve an operation at higher efficiency, the reformer is desirably configured to cause not only partial oxidation reforming reaction but also steam reforming reaction.

The heating device 3 is configured to heat the hydrodesulfurizer 2 with heat of exhaust gas flowing in the fuel cell system 100. Specifically, exhaust gas flowing in the fuel cell system 100 is guided through the introduction passage 6 to the heating device 3; and the exhaust gas passes through the heating device 3 to cause transfer of a portion of the heat of the exhaust gas to the hydrodesulfurizer 2, to thereby heat the hydrodesulfurizer 2 to a desired temperature. Specifically, within the heating device 3, a distribution route 3a through which exhaust gas passes is formed (for example, refer to FIG. 5 described below). Exhaust gas passes through this distribution route 3a and subsequently passes through the discharging passage 7 to the second heat exchanger 4.

Regarding the hydrodesulfurizer 2 and the heating device 3, the hydrodesulfurizer 2 is disposed on the heating device 3 so as to be in surface contact with each other through at least one surface. The casings (housings) of the hydrodesulfurizer 2 and the heating device 3 are formed of a metal such as stainless steel. When exhaust gas passes through the distribution route 3a formed within the heating device 3, heat of the exhaust gas is transferred from the heating device 3 to the hydrodesulfurizer 2 via the contact surface. As a result, the desulfurizing catalyst within the hydrodesulfurizer 2 is kept at an appropriate temperature.

At least a portion of the hydrodesulfurizer 2 may be covered with a heat insulator. By thus covering the hydrodesulfurizer 2 with a heat insulator, heat dissipation from the hydrodesulfurizer 2 can be suppressed; in addition, the hydrodesulfurizer 2 can be prevented from directly being exposed to high heat (high temperature) such as radiant heat from a combustor 16 (refer to FIGS. 2 and 3 described below) and heat of combustion exhaust gas generated by combustion in the combustor 16. Since heat dissipation from the hydrodesulfurizer 2 can be suppressed, the hydrodesulfurizer 2 can substantially have a uniform temperature distribution and temperature unevenness can be suppressed. Thus, temperature control of the desulfurizing catalyst in the hydrodesulfurizer 2 can be facilitated.

The first heat exchanger 5 is configured to heat (preheat) oxidant gas to be supplied to the fuel cell 1, with heat of exhaust gas flowing in the fuel cell system 100. Specifically, the first heat exchanger 5 is configured to heat oxidant gas supplied from outside the fuel cell system 100, to a predetermined temperature through heat exchange with exhaust gas. For example, oxidant gas passing through the first heat exchanger 5 is heated to a temperature of 400° C. to 800° C. by heat exchange with exhaust gas. This heated oxidant gas is supplied to the fuel cell 1. In the fuel cell system 100, exhaust gas having been partially deprived of heat by heat exchange with oxidant gas in the first heat exchanger 5, is guided to the heating device 3. Thus, in the fuel cell system 100, exhaust gas having a high temperature of 400° C. to 800° C. can be cooled by the first heat exchanger 5 to a temperature suitable for heating the hydrodesulfurizer 2 and then guided to the heating device 3.

The second heat exchanger 4 is configured to preheat oxidant gas to be preheated by the first heat exchanger 5, with heat of exhaust gas having been partially deprived of heat to heat the hydrodesulfurizer 2 in the heating device 3. The exhaust gas discharged from the heating device 3 still has available heat in a sufficiently large amount. Accordingly, the second heat exchanger 4 uses this heat of the exhaust as to preheat oxidant gas prior to preheating in the first heat exchanger 5. As a result, an amount of heat of exhaust gas used in the first heat exchanger 5 can be reduced.

By changing the heat exchanging capability ratio between the second heat exchanger 4 and the first heat exchanger an amount of heat of exhaust gas used in the first heat exchanger 5 can be controlled. As a result, exhaust gas controlled to be in an appropriate temperature range can be guided to the heating device 3.

As described above, in the fuel cell system 100 according to the first embodiment, before oxidant gas is preheated w heat of exhaust gas in first heat exchanger 5, the oxidant gas is preheated by second heat exchanger 4.

In the case where the flow rate of oxidant gas increases due to, for example, change power generation load, exhaust gas is deprived of a large amount of heat during heat exchange with the oxidant gas in the first heat exchanger 5, compared with prior to the change in power generation load. As a result, the exhaust gas may have an amount of heat insufficient for serving as the heat source of the heating device 3. However, in the fuel cell system 100 according to this embodiment, the second heat exchanger 4 is disposed upstream of the first heat exchanger 5, so that an amount of heat of exhaust gas used for heat exchange with oxidant gas in the first heat exchanger 5 can be reduced.

In addition, in the fuel cell system 100, heat of exhaust gas can be recovered by the second heat exchanger 4 and supplied to power generation of the fuel cell. Accordingly, the power generation efficiency can be enhanced, compared with a configuration in which exhaust gas having passed through the heating device 3 is discharged outside a housing 30 without subsequent heat recovery.

Hereinafter, Examples 1 and 2 will be described. In Example 1, the fuel cell 1 of the fuel cell system 100 in FIG. 1 is a cylindrical type fuel cell. In Example 2, the fuel cell 1 of the fuel cell system 100 in FIG. 1 is a flat plate type fuel cell.

Example 1

Figure 2:
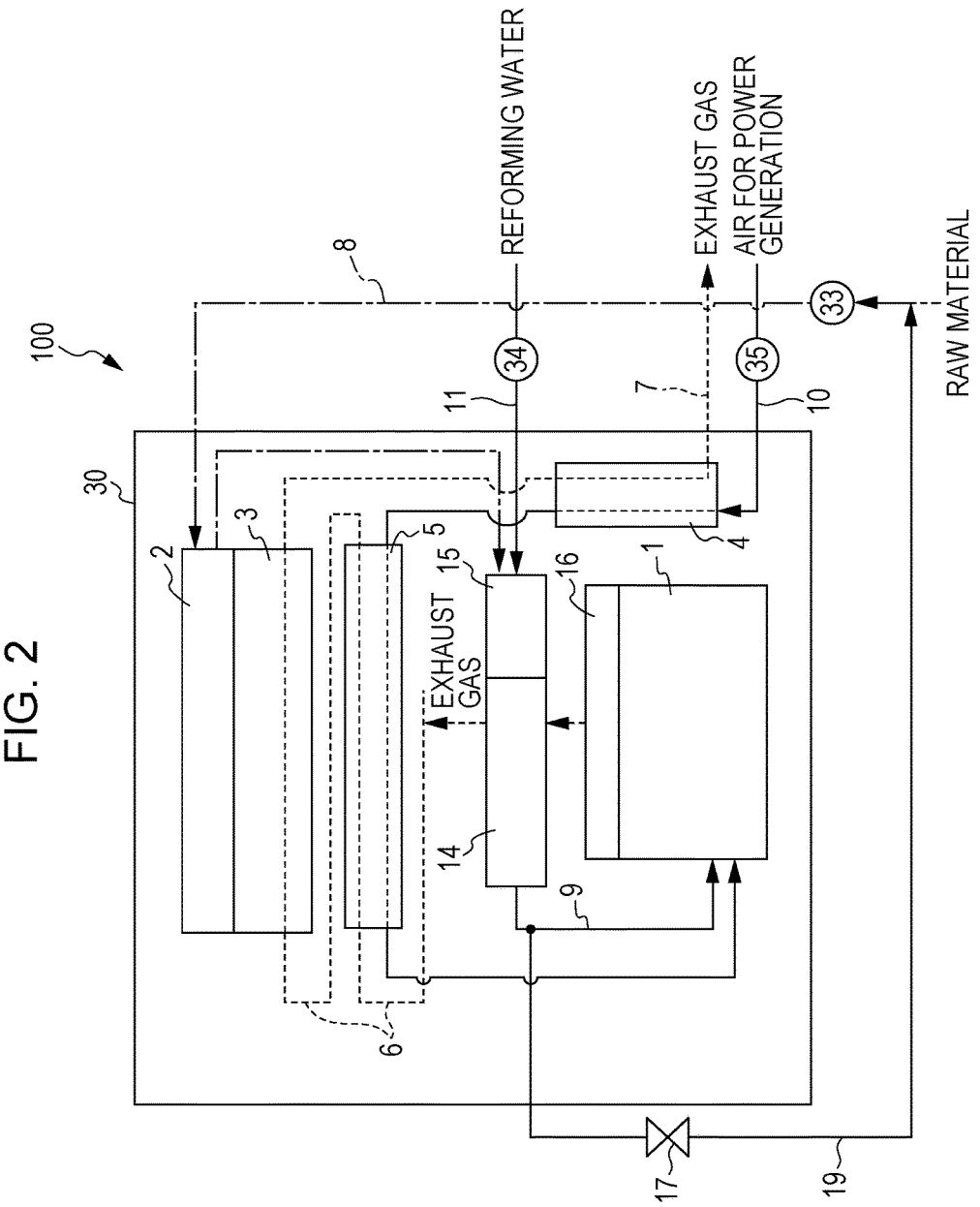
FIG. 2 is a schematic view illustrating the configuration of a fuel cell system in Example 1 according to a first embodiment.

Referring to FIG. 2, Example 1 of the fuel cell system 100 according to the first embodiment will be described FIG. 2 is a schematic view illustrating the configuration of the fuel cell system 100 in Example 1 according to the first embodiment.

In the case where the fuel cell 1 is a cylindrical type fuel cell, for example, the fuel cell system 100 according to the first embodiment in FIG. 1 may have the configuration of Example 1 in FIG. 2. Specifically, the fuel cell system 100 according to Example 1 includes, in addition to the fuel cell 1, the hydrodesulfurizer 2, the heating device 3, the second heat exchanger 4, and the first heat exchanger 5 described above, a reformer 14, an evaporator 15, a combustor 16, a decompressor 17, a compressor 33, a water pump 34, and an air pump 35. Among these components, components except for the decompressor 17, the compressor 33, the water pump 34, and the air pump 35 are contained within a housing 30. On the inner walls of the housing 30, heat insulators are disposed. The fuel cell 1, the reformer 14, and the evaporator 15 are disposed within a space surrounded by the heat insulators. The hydrodesulfurizer 2, the heating device 3, the first heat exchanger 5, and the second heat exchanger 4 are disposed within the heat insulators.

In the fuel cell system 100 according to Example 1, fuel and oxidant gas that have not been used in the fuel cell 1 are burnt in the combustor 16; and the resultant combustion exhaust gas is used as the above-described exhaust gas.

In the fuel cell system 100 according to Example 1, raw material having been compressed by the compressor 33 is supplied through the material supplying passage 8 into the housing 30. Oxidant gas (the air for power generation) having been compressed by the air pump 35 is supplied through the air passage 10 into the housing 30. Reforming water is supplied by the water pump 34 through a reforming water passage 11 into the housing 30.

Raw material supplied into the housing 30 contains reformed gas having a hydrogen gas content of about 70% (about 10% relative to the raw material). The raw material containing hydrogen is guided to the hydrodesulfurizer 2 within the housing 30. As described above, the hydrodesulfurizer 2 is covered with a heat insulator. Accordingly, heat dissipation and heat transfer from the hydrodesulfurizer 2 can be minimized. As a result, the temperature of the desulfurizing catalyst heated by the heating device 3 can be stabilized within an appropriate temperature range for the desulfurizaton reaction (about 250° C. to about 300° C.). The raw material having been desulfurized by the hydrodesulfurizer 2 is guided to the evaporator 15 disposed upstream of the reformer 14.

A reforming treatment performed by the reformer 14 will be described. In the fuel cell system 100 according to Example 1, the reformer 14 may have the following configuration. The reformer 14 may be configured to perform partial oxidation reforming. However, in order to achieve an operation at higher efficiency, the reformer 14 is configured to cause not only partial oxidation reforming reaction but also reforming reaction using steam. Examples of the reforming reaction using steam include steam reforming reaction and autothermal reaction.

For example, water (reforming water) sent by the water pump 34 through the reforming water passage 11 is mixed and supplied to the evaporator 15. The evaporator 15 is disposed upstream of the reformer 14. The evaporator 15 is configured to evaporate water (reforming water) supplied through the reforming water passage 11, with heat of combustion exhaust gas generated in the combustor 16 and radiant heat from the combustor 16, so that steam is generated. Steam generated in the evaporator 15 is mixed with desulfurized raw material supplied from the hydrodesulfurizer 2.

The reformer 14 is filled with a reforming catalyst that is, for example, $Al_2O_3$ (alumina) spherical particles supporting Ni provided by impregnation of the particle surfaces with Ni, or $Al_2O_3$ spherical particles to the surfaces of which ruthenium is attached.

At the time of start of the fuel cell system 100, the reformer 14 does not have sufficient thermal energy for performing steam reforming reaction, which is an endothermic reaction. Accordingly, at the time of start of the fuel cell system 100, without supply of water to the evaporator 15 through the reforming water passage 11, the air for reforming is supplied to the reformer 14 through a reforming air passage (not shown); and the reformer 14 subjects this air to partial oxidation reforming reaction represented by the following formula (3) to thereby generate hydrogen gas and carbon monoxide.

$$C_nH_m+(n/2)O_2 \rightarrow n \cdot CO+(m/2)H_2 \text{ (}n\text{ and }m\text{ represent given natural numbers)} \quad (3)$$

Subsequently, the hydrogen gas and carbon monoxide are supplied through a reformed gas passage 9 to the fuel cell 1, and mixed with oxidant gas and used for power generation.

After the start of the fuel cell system 100, as power is generated, the temperature of the reformer 14 increases. Specifically, the temperature of the reformer 14 is increased because the partial oxidation reforming reaction represented by the formula (3) is an exothermic reaction and, in addition, combustion exhaust gas heats the reformer 14. Subsequently, after the temperature of the reformer 14 reaches, for example, 400° C. or more, steam reforming reaction represented by the following formula (4) can be simultaneously performed.

$$C_nH_m+n \cdot H_2O \rightarrow n \cdot CO+(m/2+n)H_2 \text{ (}n\text{ and }m\text{ represent given natural numbers} \quad (4)$$

This steam reforming reaction represented by the formula (4) generates a large amount of hydrogen from a given amount of hydrocarbon ($C_nH_m$) and, as a result, provides a large amount of reformed gas available to power generation reaction in the fuel cell 1, compared with the partial oxidation reforming reaction represented by the formula (3). In shorn, the steam reforming reaction can produce reformed gas more efficiently. Since the steam reforming reaction represented by the formula (4) is an endothermic reaction, the steam reforming reaction is made to proceed by using, for example, heat generated by the partial oxidation reforming reaction represented by the formula (3) and heat of combustion exhaust gas generated in the combustor 16. Subsequently, after the temperature of the reformer 14 reaches, for example, 600° C. or more, an amount of heat required for the steam reforming reaction represented by the formula (4) can be supplied by, for example, heat of combustion exhaust gas alone. Thus, operation with the partial oxidation reforming reaction and the steam reforming reaction can be switched to operation with the steam reforming reaction alone.

Referring to FIG. 2, in the configuration of the fuel cell system 100, a recycle passage 19 is branched off at an intermediate portion (branch portion) of the reformed gas passage 9, which extends from the reformer 14 to the fuel cell 1. The recycle passage 19 is configured to send a portion of reformed gas generated in the reformer 14 back to the material supplying passage 8. As a result, hydrogen can be added to raw material to be supplied to the hydrodesulfurizer 2, so that the hydrodesulfurizer 2 uses this hydrogen to perform the above-described hydrodesulfurization.

Referring to FIG. 2, in the configuration of the fuel cell system 100, the decompressor 17 is disposed at an intermediate portion of the recycle passage 19. The decompressor 17 is configured to control the flow rate of reformed gas passing through the recycle passage 19. The decompressor 17 can be provided, as, for example, a capillary tube or an orifice. Specifically, in the decompressor 17, for example, a capillary tube or an orifice is employed such that the flow passage is narrowed to increase the pressure loss. In this way, the reformed gas is controlled to pass through the recycle passage 19 at a desired flow rate. Although the decompressor 17 is disposed outside the housing 30 in FIG. 2, it may be disposed inside the housing 30. In the case where the decompressor 17 is disposed outside the housing 30, direct exposure to high temperature due to combustion exhaust gas or the like can be advantageously prevented. Alternatively, in the case where the decompressor 17 is disposed inside the housing 30, since the housing 30 has a high internal temperature, condensation of water tends not to occur in the decompressor 17; accordingly, the fuel cell system 100 can be advantageously designed so as to have a small size.

A condenser (not shown) may be disposed at an intermediate portion of the recycle passage 19. In the case of disposing the condenser, when the temperature of reformed gas passing through the recycle passage 19 decreases, water can be collected by the condenser. As a result, the occurrence of problems can be suppressed, such as clogging of the passage due to condensed water, or corrosion or breakage of the compressor 33. The condenser may be a double-pipe heat exchanger using, as a cooling source, any one of raw fuel gas, the air, and water. Condensed water generated by the condenser may be discharged outside the fuel cell system 100; alternatively, for example, the condensed water may be recycled as reforming water.

As described above, in the fuel cell system 100 according to Example 1, oxidant gas to be supplied to the fuel cell 1 is preheated by two heat exchangers (the first heat exchanger 5 and the second heat exchanger 4). Specifically, referring to FIG. 2, oxidant gas supplied from outside the fuel cell system 100 is preheated in the second heat exchanger 4 by heat exchange with combustion exhaust gas having passed through the heating device 3; and this oxidant gas having been preheated by the second heat exchanger 4 is further subjected to, in the first heat exchanger 5, heat exchange with combustion exhaust gas generated in the combustor 16. As a result of this heat exchange, the oxidant gas is heated to a temperature close to the operation temperature of the fuel cell 1 and then supplied to the fuel cell 1. The combustion exhaust gas having been deprived of heat by the heat exchange with oxidant gas in the second heat exchanger 4, is discharged outside the housing 30.

Example 2

Figure 3:
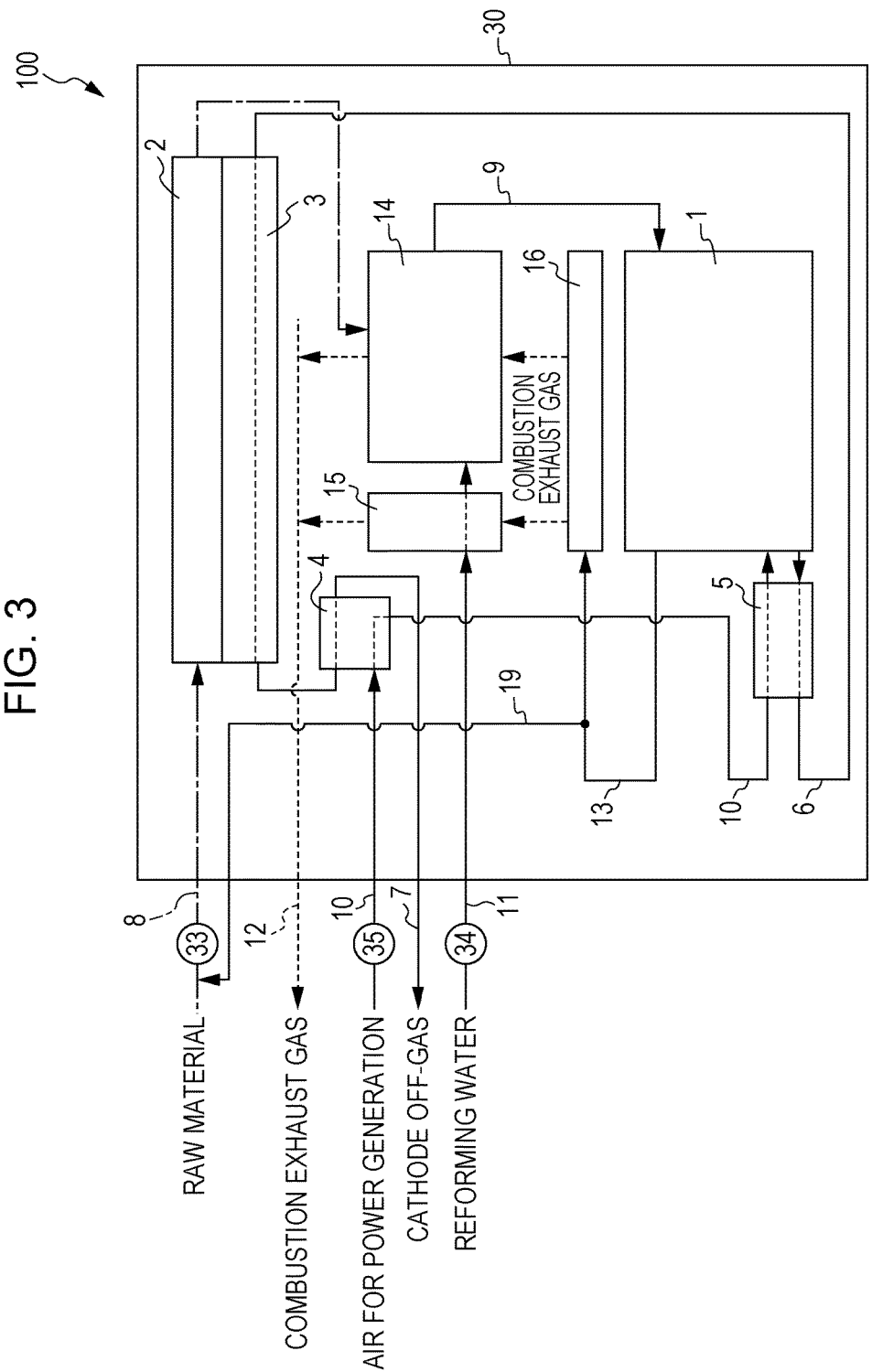
FIG. 3 is a schematic view illustrating the configuration of a fuel cell system in Example 2 according to a first embodiment.

Alternatively, in the fuel cell system 100 according to the first embodiment, the fuel cell 1 may be a flat plate type fuel cell. In this case, the fuel cell system 100 may have, for example, a configuration illustrated in FIG. 3. FIG. 3 is a schematic view illustrating the configuration of the fuel cell system 100 in Example 2 according to the first embodiment.

As illustrated in FIG. 3, the fuel cell system 100 in Example 2 according to the first embodiment includes components similar to those in Example 1 and is different from Example 1 in the following points.

The fuel cell system 100 in Example 2 is different from Example 1 in that the fuel cell 1 discharges unused oxidant gas (cathode off-gas) and unused fuel (anode off-gas) through different passages. Thus, the fuel cell system 100 in Example 2 further includes an anode off-gas passage 13 through which anode off-gas passes.

Example 2 is also different from Example 1 in that exhaust gas guided as a heat source to the heating device 3 is cathode off-gas in Example 2, whereas it is combustion exhaust gas in Example 1. Example 2 is also different from Example 1 in that combustion exhaust, gas generated by combustion of anode off-gas is used to heat the reformer 14 and the evaporator 15 and subsequently discharged through a combustion exhaust gas passage 12 to outside the housing 30. Example 2 is also different from Example 1 in the following point. In the fuel cell system 100 in Example 1, a portion of reformed gas (fuel) generated by reforming in the reformer 14 is supplied through the recycle passage 19 to upstream of the compressor 33. In contrast, in the fuel cell system 100 in Example 2, a portion of anode off-gas discharged from the fuel cell 1 is supplied through the recycle passage 19 to upstream of the compressor 33.

Referring to FIG. 3, in Example 2, oxidant gas (the air for power generation) is supplied through the air passage 10 to the cathode of the fuel cell 1; and fuel is supplied from the reformer 14 through the reformed gas passage 9 to the anode of the fuel cell 1. For example, the fuel cell 1 may include electric cells that are connected in series. Each electric cell is configured to generate power through an electrochemical reaction between the anode and the cathode. The electric cell may have a known configuration employing, for example, as an electrolyte, yttria-stabilized zirconia, which is zirconia doped with yttrium oxide.

Oxidant gas sent by the air pump 35 is preheated in the second heat exchanger 4 by heat exchange with cathode off-gas having been heat-exchanged in the heating device 3. The preheated oxidant gas to be supplied to the cathode of the fuel cell 1 is preheated again in the first heat exchanger 5 by heat exchange with cathode off-gas discharged from the fuel cell 1. As a result of these two preheating steps, the oxidant as is heated to a temperature close to the operation temperature of the fuel cell 1 and then supplied to the cathode of the fuel cell 1. As described above, the cathode off-gas discharged from the fuel cell 1 is partially deprived of heat by heat exchange with oxidant gas to be supplied to the fuel cell 1 and then guided no the beating device 3.

The heating device 3 is configured to heat the hydrodesulfurizer 2 with heat of the cathode off-gas. As described above, the cathode off-gas discharged from the heating device 3 is heat-exchanged with oxidant gas in the second heat exchanger 4. In short, the cathode off-gas discharged from the heating device 3 still has available heat and hence this heat is recovered by the second heat exchanger 4 disposed within the fuel cell system 100. As a result of this heat exchange, the cathode off-gas is partially deprived of heat and then discharged outside the housing 30.

In the above-described fuel cell system 100 according to the first embodiment, exhaust gas having been deprived of heat by heat exchange with oxidant gas in the second heat exchanger 4 is discharged outside the fuel cell system 100. However, the first embodiment is not limited to this configuration. Alternatively, for example, exhaust gas, heat of which has been partially used in the second heat exchanger 4, may be guided to the evaporator 15, so that heat of the exhaust gas is used to evaporate reforming water. Alternatively, the fuel cell system 100 may further include a raw material preheater (not shown) configured to perform heat exchange between the exhaust gas and raw material passing through the material supplying passage 8, so that this raw material preheater preheats the raw material.

Temperature Control of Exhaust Gas

Hereinafter, temperature control of exhaust gas will be described with reference to, as an example, the fuel cell system 100 according to Example 1 in FIG. 2. Specifically, exhaust gas is passed in the fuel cell system 100 to thereby heat the hydrodesulfurizer 2 as described below. In the case of the fuel cell system 100 in FIG. 2, exhaust gas used to heat the hydrodesulfurizer 2 is combustion exhaust gas generated in the combustor 16 by combustion of fuel and the air that have not been used.

The flow rate and temperature of combustion exhaust has generated in the combustor 16 can be controlled by adjusting fuel utilization efficiency of fuel and oxidant gas in the fuel cell 1 (rate of consumption of fuel and oxidant gas as fuel in the fuel cell 1 during power generation). In the fuel cell system 100 according to Example 1 in FIG. 2, for example, the fuel utilization efficiency of fuel and oxidant gas in the fuel cell 1 is set such that the temperature of the combustor 16 falls within a range of about 600° C. to about 900° C.

In the combustor 16 thus set to be in a desired temperature range, exhaust gas (combustion exhaust gas) is generated by combustion of fuel and oxidant gas that have not been used. This exhaust gas heats the reformer 14 and the evaporator 15. As a result, the heat of the exhaust gas is partially consumed. The exhaust gas, the heat of which has thus been partially consumed, enters the first heat exchanger 5. In the first heat exchanger 5, the exhaust gas is further deprived of heat by heat exchange between the exhaust gas and oxidant gas. As a result, the temperature of the exhaust gas is decreased to a temperature suitable for heating the hydrodesulfurizer 2. Specifically, in the case where the hydrodesulfurizer 2 is filled with a desulfurizing catalyst containing copper and zinc, the temperature of the exhaust gas is decreased to a range of about 270° C. to about 300° C.

The exhaust gas, the temperature of which has thus been further decreased, is supplied through the introduction passage 6 to the heating device 3. The exhaust gas is partially deprived of heat in the heating device 3 and then guided through the discharging passage 7 to the second heat exchanger 4. The exhaust gas having a temperature of 270° C. to 300° C. enters the heating device 3 and is partially deprived of heat in the heating device 3 so that, at the time of discharge from the heating device 3, the temperature of the exhaust gas is decreased to a range of about 250° C. to about 280° C. This temperature drop corresponds to heat having been used to preheat the raw material gas and heat having dissipated.

As described above, the exhaust gas is further deprived, of heat in the second heat exchanger 4 by heat exchange with oxidant gas to be preheated by the first heat exchanger 5.

Thus, the temperature of exhaust gas at the time of, after passing through the introduction passage 6, entry into the heating device 3, is controlled to be a desired value in consideration of, for example, the flow rate and temperature of exhaust gas generated in the combustor 16, an amount of heat absorbed by the reformer 14 and the evaporator 15, and an amount of heat absorbed by the first heat exchanger 5.

Since the second heat exchanger 4 is disposed, an amount of heat of exhaust gas absorbed by heat exchange in the first heat exchanger 5 can be controlled. As a result, exhaust gas having an appropriate amount of heat can be guided to the heating device 3. Thus, the heating device 3 can heat the hydrodesulfurizer 2 to a desired temperature suitable for hydrodesulfurization.

In the case where the hydrodesulfurizer 2 is filled with a desulfurizing catalyst that is a combination of a NiMo-based or CoMo-based catalyst and zinc oxide, adjustments are performed in terms of the flow rate and temperature of exhaust has generated in the combustor 16, an amount of heat absorbed by the reformer 14, and an amount of heat absorbed in the second heat exchanger 4 and the first heat exchanger 5, such that the temperature of exhaust gas at the time of arrival at the hydrodesulfurizer 2 is in the range of about 250° C. to about 300° C. As a result, the hydrodesulfurizer 2 is heated to a temperature suitable for hydrodesulfurization.

In the fuel cell system 100 according to the first embodiment, exhaust gas having been controlled in terms of temperature in the above-described manner can be made to flow through the introduction passage 6 into the heating device 3. As a result, in the fuel cell system 100, the hydrodesulfurizer 20 disposed on the heating device 3 can be heated with the heat of the exhaust gas to a desired temperature suitable for hydrodesulfurization.

Exhaust gas having passed through the heating device 3 still has available heat in a sufficiently large amount. Accordingly, in the case of discharging this exhaust gas outside the fuel cell system 100 without subsequent heat recovery, the heat balance of the fuel cell system 100 may become poor, resulting in a decrease in the power generation efficiency. However, the fuel cell system 100 according to the first embodiment includes the second heat exchanger 4, so that heat is recovered from exhaust gas having been discharged from the heating device 3. Thus, the amount of heat discharged from the housing 30 to outside the system can be reduced, resulting in an increase in the efficiency of the whole system.

Figure 4:
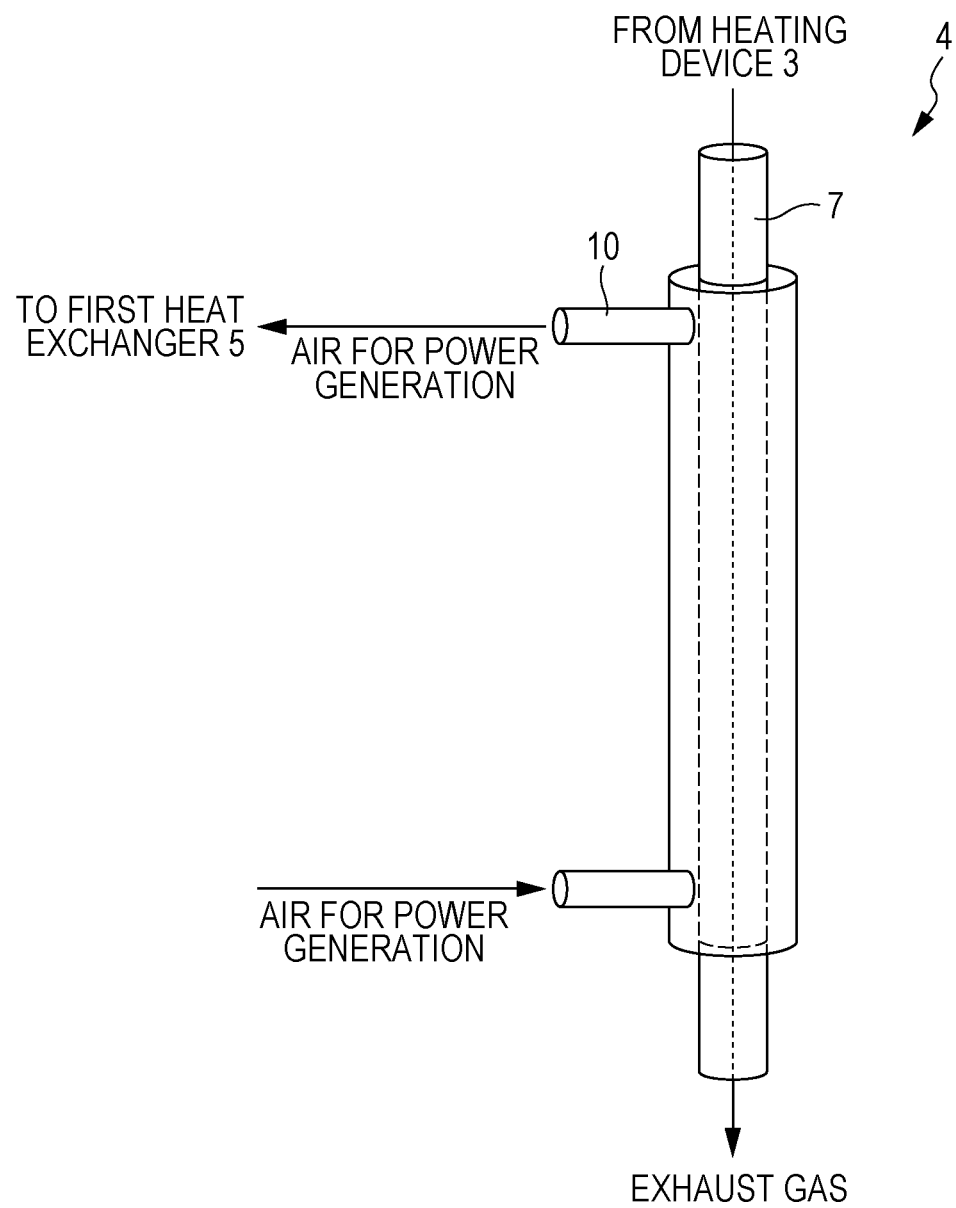
FIG. 4 illustrates an example of a second heat exchanger in a fuel cell system according to a first embodiment.

Referring to FIG. 4, the second heat exchanger 4 may be a double-pipe heat exchanger including a pipe through which oxidant gas (the air for power generation) passes and the discharging passage 7 extending through the pipe and having a smaller diameter than the pipe. FIG. 4 illustrates an example of the second heat exchanger 4 in the fuel cell system 100 according to the first embodiment.

The amount of heat exchange between exhaust gas and oxidant gas in the second heat exchanger 4 can be set to be smaller than that in the first heat exchanger 5. Accordingly, the second heat exchanger 4 can be a smaller heat exchanger than the first heat exchanger 5. The temperature of exhaust was at the time of entry into the second heat exchanger 4 is about 200° C. to about 300° C., which is much lower than the temperature of exhaust as at the time of discharge from the fuel cell 1. Thus, the heat resistant temperature of the second heat exchanger 4 can be set to be lower than that of components disposed around the fuel cell 1.

Accordingly, it is not necessary to use highly heat-resistant material such as stainless steel in order to form the entire structure of the second heat exchanger 4. For example, bonding portions in the second heat exchanger 4 can be formed by brazing. Thus, referring to FIG. 4, a counter-flow double-pipe heat exchanger, which is the simplest and the most inexpensive, can be employed as the second heat exchanger 4. By disposing this counter-flow double-pipe heat exchanger in an upright position, the size of the fuel cell system 100 can be reduced.

In the case where a double-pipe heat exchanger is employed as the second heat exchanger 4, by just replacing this double-pipe heat exchanger by another double-pipe heat exchanger having a different length, the amount of heat exchange between exhaust as and oxidant gas can be easily adjusted, which is advantageous.

Heat Exchange Unit

In the above-described fuel cell system 100, as illustrated in FIGS. 1 to 3, the first heat exchanger 5 and the second heat exchanger 4 are individually disposed as separate components.

Figure 5:
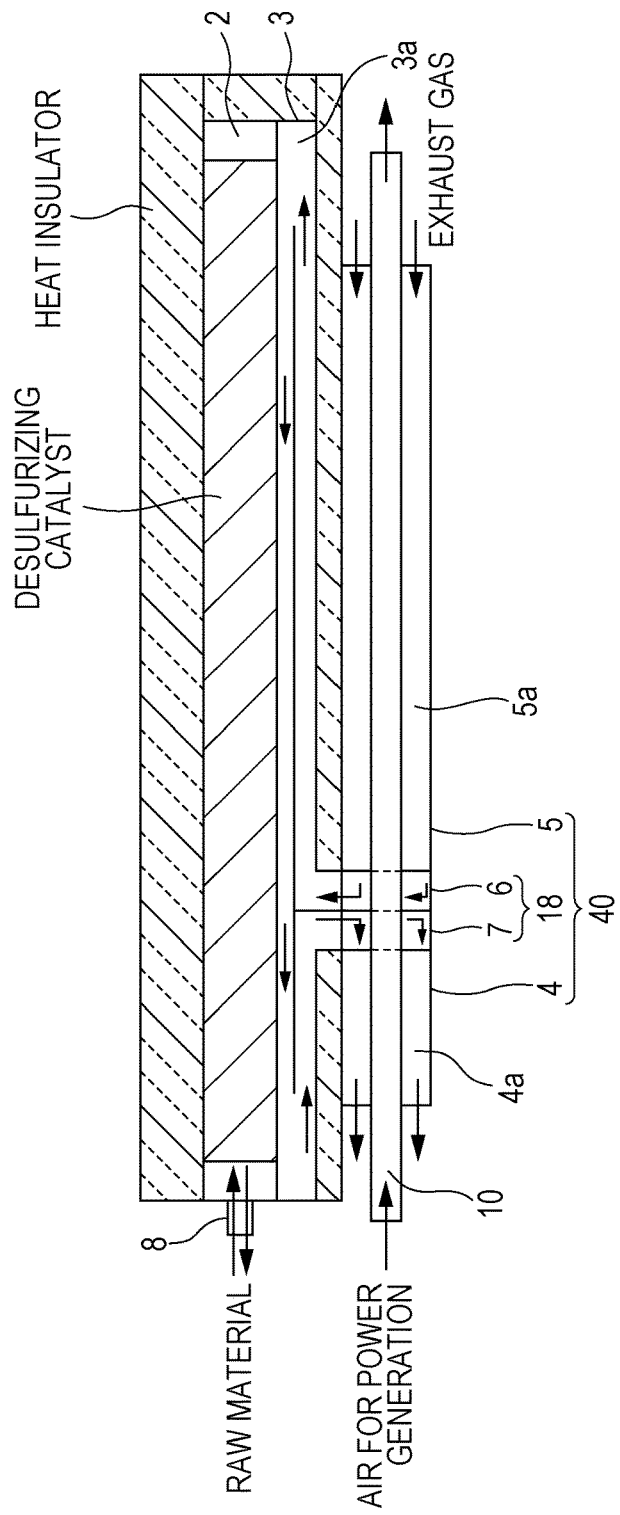
FIG. 5 illustrates an example of the configuration of a heat exchange unit in a fuel cell system according to a first embodiment.

Alternatively, referring to FIG. 5, the first heat exchanger 5 and the second heat exchanger 4 may be combined together as a single unit (heat exchange unit 40). FIG. 5 illustrates an example of the configuration of the heat exchange unit 40 in the fuel cell system 100 according to the first embodiment.

FIG. 5 is a schematic view of the configuration including the hydrodesulfurizer 2, the heating device 3, the first heat exchanger 5, and the second heat exchanger 4, when viewed from the side. As illustrated in FIG. 5, the heating device 3 is disposed under the hydrodesulfurizer 2 so as to be in surface contact with the hydrodesulfurizer 2. At least the hydrodesulfurizer 2 and the heating device 3 are covered with heat insulators. The heat exchange unit 40 is disposed under the heating device 3. The heat exchange unit 40 is connected to the heating device 3 via a buffer 18 described below.

As described above, the heat exchange unit 40 is a single unit in which the first heat, exchanger 5 and the second heat, exchanger 4 are integrated with the buffer 18 therebetween. The buffer 18 includes the introduction passage 6 and the discharging passage 7 and is configured to allow flow of exhaust gas from the heat exchange unit 40 through the heating device 3 and back to the heat exchange unit 40. The buffer 18 also functions as a buffer section that separates the second heat exchanger 4 and the first heat exchanger 5 from each other.

In FIG. 5, in the buffer 18, the introduction passage 6 vertically extending is disposed on the right and the discharging passage 7 vertically extending is disposed on the left; and the introduction passage 6 and the discharging passage 7 are integrated. In the upper end of the buffer 18, an end of the introduction passage 6 is connected to one end of the distribution route 3a formed in the heating device 3, and an end of the discharging passage 7 is connected to the other end of the distribution route 3a.

The introduction passage 6 has an opening on the right side surface and, via this opening, is in communication with an exhaust gas passage 5a through which exhaust gas passes in the first heat exchanger 5. The discharging passage 7 has an opening on the left side surface and, via this opening, is in communication with an exhaust gas passage 4a through which exhaust gas passes in the second heat exchanger 4.

In the heating device 3, the distribution route 3a connected to the introduction passage 6 is formed so as to extend to the right end of the heating device 3, so as to return from the right end to the left end of the heating device 3, so as to return from the left end toward the right end of the heating device 3, and so as to be connected to the discharging passage 7. In short, the distribution route 3a is formed such that exhaust gas can be passed counterclockwise from the right end to the heft end of the heating device 3. Accordingly, the hydrodesulfurizer 2 disposed on the heating device 3 can be uniformly heated with heat of exhaust gas.

In the heat exchange unit 40, the air passage 10 through which oxidant gas passes is disposed within the first heat exchanger 5 and the second heat exchanger 4. Specifically, referring to FIG. 5, the air passage 10 extends through the second heat exchanger 4, the buffer 18, and the first heat exchanger 5. The air passage 10 is configured to pass oxidant gas through the second heat exchanger 4, the buffer 18, and the first heat exchanger 5 in this order, so that the oxidant gas is heated (preheated).

Specifically, the air passage 10 is configured to pass oxidant gas through the second heat exchanger 4, the buffer 18, and the first heat exchanger 5 in this order; exhaust gas to be supplied to the heating device 3 passes around the air passage 10 within the it heat exchanger 5; and exhaust gas having been discharged from the heating device 3 passes around the air passage 10 within the second heat exchanger 4. Accordingly, the oxidant gas is preheated in the second heat exchanger 4 by heat exchange with exhaust gas having been discharged from the heating device 3. Subsequently, the oxidant gas is preheated in the first heat exchanger 5 by heat exchange with exhaust gas to be supplied to the heating device 3.

In summary, the heat exchange unit 40 is a single unit in which the first heat exchanger 5 and the second heat exchanger 4 are integrated. The heat exchange unit 40 includes the buffer 18, which includes a portion of the introduction passage 6 connecting the heating device 3 to the first heat exchanger 5 and a portion of the discharging passage 7 connecting the heating device 3 to the second heat exchanger 4. The buffer 18 physically separates the first heat exchanger 5 and the second heat exchanger 4 from each other. The first heat exchanger 5 and the second heat exchanger 4 are connected to each other via, the buffer 18. The air passage 10 is disposed so as to extend through the first heat exchanger 5 and the second heat exchanger 4, which are connected together.

As described above, the second heat exchanger 4 and the first heat exchanger 5 can be integrated together via, the buffer 18 including the introduction passage 6 and the discharging passage 7. Accordingly, the fuel cell system 100 having such a configuration can be designed so as to have a small size, compared with another fuel cell system 100 in which the second heat exchanger 4 and the first heat exchanger 5 are individually disposed at separate positions.

Second Embodiment

Figure 6:
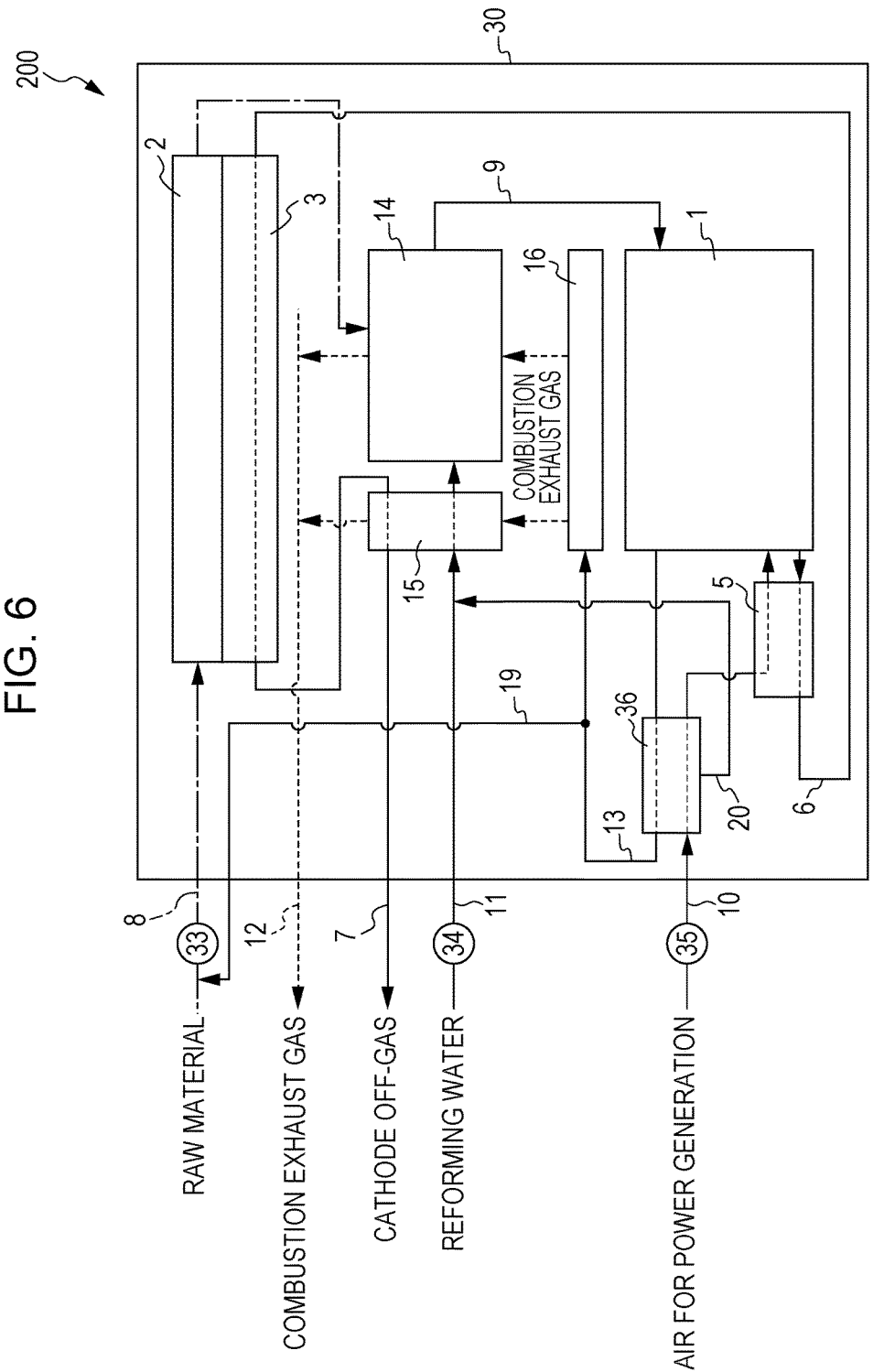
FIG. 6 is a schematic view illustrating the configuration of a fuel cell system according to a second embodiment.

Hereinafter, referring to FIG. 6, the configuration of a fuel cell system 200 according to a second embodiment will be described. FIG. 6 is a schematic view illustrating the configuration of the fuel cell system 200 according to the second embodiment.

In the above-described fuel cell system 100 according to the first embodiment, exhaust gas is used as heat sources for preheating oxidant gas in the second heat exchanger 4 and the first heat exchanger 5. The fuel, cell system 200 according to the second embodiment is different from the fuel, cell system 100 in that a flat plate type fuel cell is employed as the fuel cell 1, and unused fuel (anode off-gas) discharged from the anode of the fuel cell 1 is used as the heat source for preheating the air for power generation, the preheating being performed upstream of the first heat exchanger 5. The fuel cell system 200 according to the second embodiment is also different in that it includes a condenser 36 instead of the second heat exchanger 4. The fuel cell system 200 is also different in that exhaust gas discharged from the heating device 3 is heat-exchanged in the evaporator 15 and then discharged outside the fuel cell system 200. The condenser 36 is an example of the second heat exchanger of this disclosure. Except for these features, the fuel cell system 200 has the same configuration as the fuel cell system 100 according to the first embodiment. Accordingly, like components are denoted with like reference numerals and descriptions thereof are omitted.

The condenser 36 is configured to preheat oxidant gas (the air for power generation) with heat of anode off-gas, which is exhaust gas having been discharged from the fuel cell 1. Specifically, the condenser 36 is configured to perform heat exchange between anode off-gas and oxidant gas, so that the anode off-gas is cooled to undergo condensation and the oxidant gas is preheated. The resultant condensed water obtained by condensation of the anode off-gas by the condenser 36 is passed through a condensed water passage 20 and then mixed with reforming water to be supplied to the evaporator 15.

As illustrated in FIG. 6, in order to mix hydrogen with raw material to be supplied to the hydrodesulfurizer 2, the fuel cell system 200 according to the second embodiment is configured to supply a portion of anode off-gas to a position of the material supplying passage 8, the position being upstream of the compressor 33. The anode off-gas discharged from the fuel cell 1 has a high temperature because the fuel cell 1 operates at a high temperature. Introduction of this anode off-gas having a high temperature to an upstream portion of the compressor 33 may damage the compressor 33. Accordingly, in the fuel cell system. 200 according to the second embodiment, the condenser 36 is used to decrease the temperature of anode off-gas and to preheat oxidant gas to be preheated by the first heat exchanger 5. In addition, condensed water obtained by condensation of anode off-gas can be supplied as a portion of reforming water that is to be supplied to the evaporator 15.

In the fuel cell system 200 according to the second embodiment, heat of exhaust gas having been discharged from the heating device 3 is used as a portion of a heat source for evaporating reforming water in the evaporator 15.

In summary, in the fuel cell system 200 according to the second embodiment, the condenser 36 is configured to preheat oxidant gas upstream of the first heat exchanger 5 by using heat of anode off-gas, which is one of exhaust gases having been discharged from the fuel cell 1. The oxidant gas having been preheated by the condenser 36 can be further preheated by the first heat exchanger 5 by using heat of cathode off-gas, which is another one of exhaust gases having been discharged from the fuel cell 1.

Thus, an amount of heat of cathode off-gas used for preheating oxidant gas in the first heat exchanger 5 can be reduced. Accordingly, the occurrence of a case where cathode off-gas having reached the heating device 3 does not have a sufficient amount of heat for serving as the heat source of the heating device 3 can be suppressed.

The fuel cell system 200 according to the second embodiment is configured to use heat of cathode off-gas having been discharged from the heating device 3, so that reforming water is evaporated in the evaporator 15. Accordingly, compared with a configuration in which cathode off-gas having passed through the heating device 3 is discharged outside the housing 30 without subsequent heat recovery, an amount of heat discharged outside the housing 30 can be decreased by an amount of heat recovered from cathode off-gas and used in the evaporator 15. As a result, a fuel cell system that has, as a whole, a high power generation efficiency can be provided.

In summary, the solid oxide fuel cell system according to the second embodiment can provide a sold oxide fuel cell system configured to operate at a high efficiency and with stability.

Figure 7:
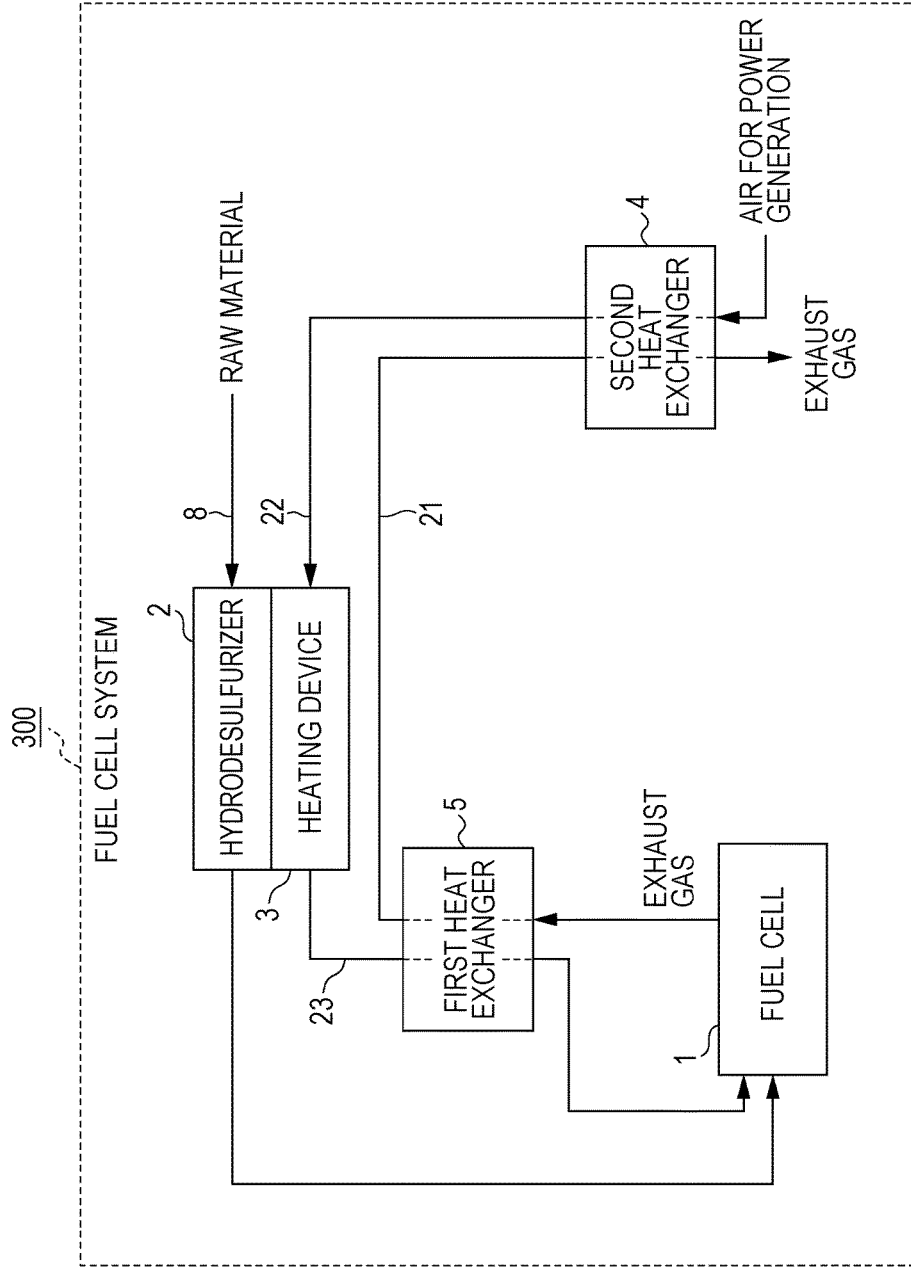
FIG. 7 is a block diagram illustrating an example of a main configuration of a fuel cell system according to a third embodiment.
Figure 8:
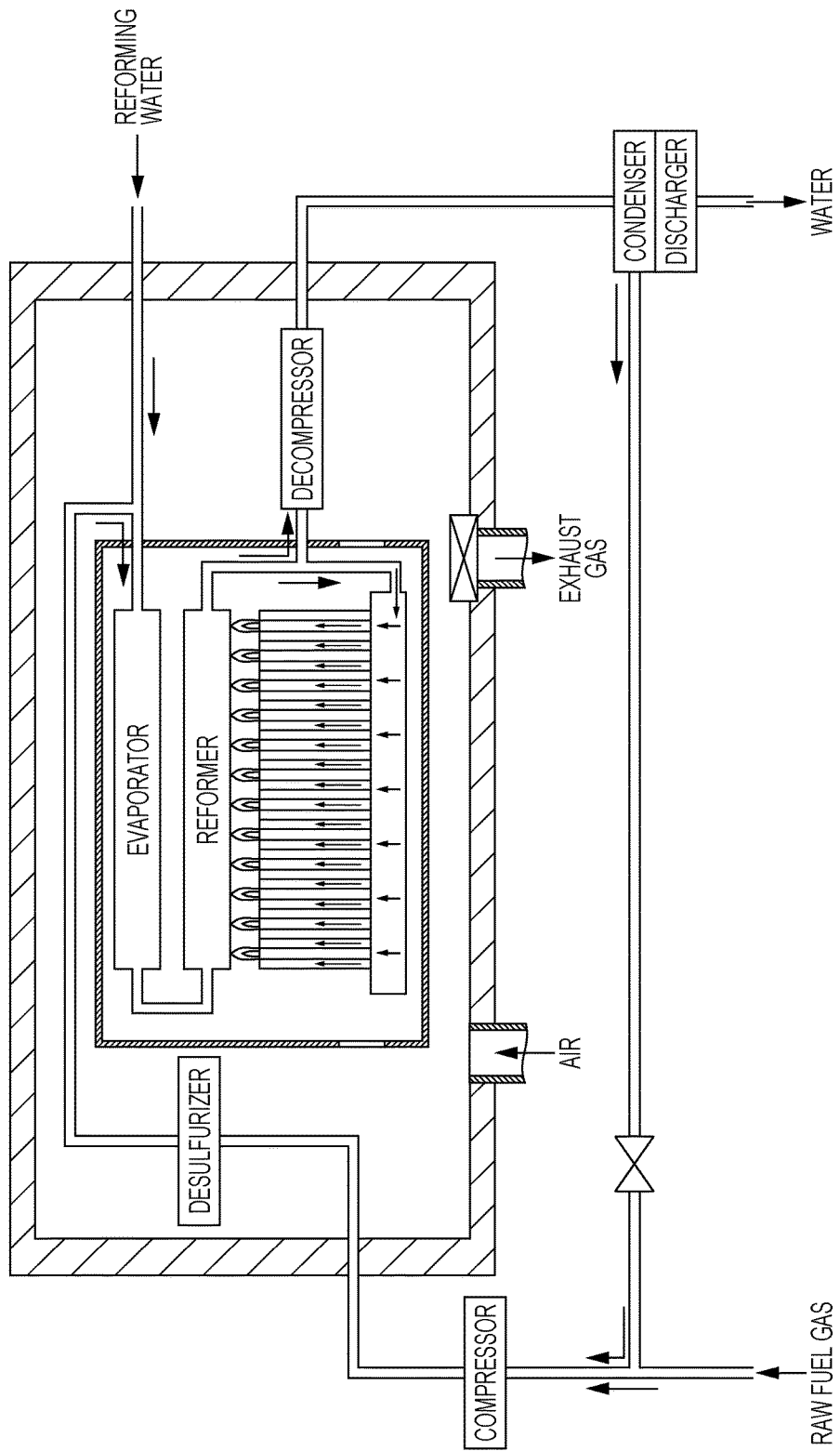
FIG. 8 is a schematic view illustrating an example of the configuration of an existing solid oxide fuel cell system.

Third Embodiment in the above-described fuel cell systems 100 and 200 according to the first and second embodiments, the heating device 3 is configured to heat the hydrodesulfurizer 2 with heat of exhaust gas having been discharged from the fuel cell. However, heat used by the heating device 3 for heating the hydrodesulfurizer 2 is not limited to the heat of exhaust gas. For example, in the case where oxidant gas having been preheated with exhaust gas has a sufficiently large amount of heat as a heat source in the heating device 3, this preheated oxidant gas may be used as the heat source. Hereinafter, referring to FIG. 7, such a configuration in which heat of preheated oxidant gas is used as the heat source of the heating device 3 will be described as a third embodiment. FIG. 7 is a block diagram illustrating an example of a main configuration of a fuel cell system 300 according to the third embodiment.

The fuel cell system 300 according to the third embodiment is different from the fuel cell system 100 in FIG. 1 according to the first embodiment in the following points. The fuel cell system 300 is different in that it includes, instead of the air passage 10, a preheated air introduction passage 22 configured to guide oxidant gas (the air for power generation) having been preheated in the second heat exchanger 4, to the heating device 3; and a preheated air passage 23 configured to supply oxidant gas having been heat-exchanged in the heating device 3, to the fuel cell 1. The fuel cell system 300 is also different in that it includes, instead of the introduction passage 6 and the discharging passage 7, a heat-exchange exhaust gas passage 21 (passage configured to pass exhaust gas used for heat exchange). Except for these components, the fuel cell system 300 has the same configuration as the fuel cell system 100 according to the first embodiment. Accordingly, like components are denoted with like reference numerals and descriptions thereof are omitted.

In the fuel cell system 300 having the above-described configuration, exhaust gas and oxidant gas flow in the following manner. Referring to FIG. 7, oxidant gas supplied to the fuel cell system 300 is preheated by heat exchange with exhaust gas (flowing in the fuel cell system 300) in the second heat exchanger 4. This exhaust gas is used in the second heat exchanger 4 for heat exchange with oxidant gas after having been partially deprived of heat in the first heat exchanger 5. However, this exhaust gas still has such a large amount of heat that can preheat, in the second heat exchanger 4, oxidant gas to a temperature of 270° C. to 300° C. Thus, the resultant oxidant gas can be used as the heat source of the heating device 3.

The oxidant gas having been preheated by heat exchange with exhaust gas in the second heat exchanger 4 is passed through the preheated air introduction passage 22 to the heating device 3. The heating device 3 is configured to heat the hydrodesulfurizer 2 disposed on the heating device 3, with a portion of the heat of the preheated oxidant gas.

Although the oxidant gas having been preheated in the second heat exchanger 4 is supplied to the heating device 3, the entirety of or a part of the preheated oxidant gas may be supplied to the heating device 3. In short, the oxidant gas is supplied at least at such a flow rate that it can heat, in the heating device 3, the hydrodesulfurizer z no an appropriate temperature. In the case (not shown in FIG. 7) where a part of the oxidant gas having been preheated in the second heat exchanger 4 is supplied to the heating device 3, the other part of the preheated oxidant gas, which is not supplied to the heating device 3, flows to the first heat exchanger 5 without passing through the heating device 3.

The oxidant gas having been partially deprived of heat in the heating device 3 is then passed through the preheated air passage 23 to the first heat exchanger 5. The first heat exchanger 5 is configured to perform heat exchange between the oxidant gas having been partially deprived of heat in the heating device 3 and exhaust gas flowing in the fuel cell system 300. As a result of this heat exchange, the oxidant gas is preheated again and then supplied to the fuel cell 1.

As described above, in the fuel cell system 300 according to the third embodiment, oxidant gas is heat-exchanged in the heating device 3 and, as a result, partially deprived of heat; however, in advance, the oxidant gas is preheated in the second heat exchanger 4. Accordingly, compared with a configuration in which the second heat exchanger 4 is not provided and oxidant gas not preheated is guided to the first heat exchanger 5, an amount of heat of exhaust gas used for preheating oxidant gas in the first heat exchanger 5 can be reduced. As a result, exhaust gas having been heat-exchanged in the first heat exchanger 5 still has a high temperature and this high-temperature exhaust gas can be guided to the second heat exchanger 4. Accordingly, the exhaust gas can sufficiently preheat oxidant gas in the second heat exchanger 4 such that the resultant oxidant gas can be used as the heat source of the heating device 3.

In addition, compared with a configuration in which exhaust gas having passed the first heat exchanger 5 is discharged outside the housing 30 without subsequent heat recovery, in the fuel cell system 300 according to the third embodiment, heat of exhaust gas is additionally recovered by the second heat exchanger 4 and used for power generation of the fuel cell. Thus, the power generation efficiency of the fuel cell system 300 can be enhanced.

From the above-described descriptions, those skilled in the art can understand various modifications and other embodiments according to the present disclosure. The above-described descriptions should be understood as mere examples and are provided for the purpose of teaching those skilled in the art the best modes for carrying out the present disclosure. Details of the configurations and/or functions in the descriptions can be substantially changed without departing from the spirit and scope of the present disclosure.

In a fuel cell system according to an embodiment of the present disclosure, the power generation efficiency is higher than that of the existing fuel cell system and the hydrodesulfurizer can be heated at an optimal temperature with stability. Therefore, this fuel cell system can be widely applied to fuel cell systems configured to remove a sulfur component from raw material gas by hydrodesulfurization.

What is claimed is:
1. A fuel cell system comprising:
a hydrodesulfurizer configured to remove a sulfur compound from raw material and configured to be heated with heat of exhaust gas flowing in the fuel cell system;
a fuel cell configured to generate power through an electrochemical reaction using fuel and oxidant gas supplied to the fuel cell, the fuel being obtained by reforming the raw material from which the sulfur compound has been removed by the hydrodesulfurizer;
an introduction passage through which the exhaust gas that is to heat the hydrodesulfurizer passes;

an air passage through which the oxidant gas is supplied to a cathode of the fuel cell;

a first heat exchanger configured to preheat, with heat of the exhaust gas passing through the introduction passage, the oxidant gas in the air passage to be supplied to the cathode of the fuel cell;

a second heat exchanger configured to preheat, with heat of exhaust gas passing through a passage other than the introduction passage, the oxidant gas in the air passage to be preheated by the first heat exchanger;

a heating device configured to heat the hydrodesulfurizer with heat of the exhaust gas flowing in the fuel cell system, wherein the air passage is configured to pass the oxidant gas through the second heat exchanger and the first heat exchanger, and wherein the hydrodesulfurizer is disposed on the heating device so as to be in surface contact with the heating device.

2. The fuel cell system according to claim 1, further comprising:

a discharging passage configured to discharge, outside the fuel cell system, the exhaust gas having been heat-exchanged to heat the hydrodesulfurizer, wherein the second heat exchanger is configured to preheat the oxidant gas with, as heat of the exhaust gas passing through a passage other than the introduction passage, heat of the exhaust gas passing through the discharging passage.

3. The fuel cell system according to claim 2, wherein the first heat exchanger and the second heat exchanger are integrated through connection via a buffer including a portion of the introduction passage connecting the heating device to the first heat exchanger and a portion of the discharging passage connecting the heating device to the second heat exchanger.

4. The fuel cell system according to claim 2, further comprising:

a raw material preheater configured to preheat the raw material to be supplied to the fuel cell, with heat of the exhaust gas having been heat-exchanged in the second heat exchanger.

5. The fuel cell system according to claim 2, further comprising:

a reformer configured to reform the raw material having been desulfurized by the hydrodesulfurizer, through a reforming reaction with steam; and an evaporator configured to generate steam with heat of the exhaust gas having been heat-exchanged in the second heat exchanger.

6. The fuel cell system according to claim 1, further comprising:

an anode off-gas passage configured to pass anode off-gas, which is the fuel not having been used to generate power by the fuel cell, wherein the introduction passage is configured to guide, as the exhaust gas, cathode off-gas, which is oxidant gas not having been used to generate power by the fuel cell, and the second heat exchanger is configured to preheat the oxidant gas with, as heat of the exhaust gas passing through a passage other than the introduction passage, heat of the anode off-gas passing through the anode off-gas passage.

7. The fuel cell system according to claim 1, wherein the second heat exchanger is a double-pipe heat exchanger configured to perform outer pipe-inner pipe heat exchange between the exhaust gas passing through a passage other than the introduction passage and the oxidant gas to be preheated by the first heat exchanger.

8. The fuel cell system according to claim 1, wherein the air passage extends through the second heat exchanger and the first heat exchanger.

9. The fuel cell system according to claim 1, wherein the exhaust gas is combustion exhaust gas generated by combustion of the fuel and the oxidant gas that have not been utilized to generate power by the fuel cell.

10. The fuel cell system according to claim 1, further comprising:

a combustor configured to generate combustion exhaust gas by combustion of the fuel and the oxidant gas that have not been used in the fuel cell, wherein the exhaust gas is the combustion exhaust gas.

* * * * *